(12) United States Patent
Mizoguchi

(10) Patent No.: US 10,839,689 B2
(45) Date of Patent: Nov. 17, 2020

(54) TRAVELING CONTROL APPARATUS OF VEHICLE

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 197 days.

(21) Appl. No.: 15/994,763

(22) Filed: May 31, 2018

(65) Prior Publication Data

US 2019/0080609 A1    Mar. 14, 2019

(30) Foreign Application Priority Data

Sep. 13, 2017 (JP) ................................. 2017-175723

(51) Int. Cl.
*G08G 1/16* (2006.01)
*B62D 5/04* (2006.01)
(Continued)

(52) U.S. Cl.
CPC ............. *G08G 1/166* (2013.01); *B60W 50/10* (2013.01); *B62D 1/286* (2013.01); *B62D 5/0463* (2013.01);
(Continued)

(58) Field of Classification Search
CPC ....... G08G 1/166; G08G 1/167; B60W 50/10; B60W 2540/18; B60W 30/16;
(Continued)

(56) References Cited

U.S. PATENT DOCUMENTS 4,309,758 A * 1/1982 Halsall ................. G05D 1/0234
180/169
4,790,402 A * 12/1988 Field .................... G05D 1/0238
180/169
(Continued)

FOREIGN PATENT DOCUMENTS

JP    2002-362391 A    12/2002
JP    2007-326576 A    12/2007
(Continued)

OTHER PUBLICATIONS

Japanese Office Action issued in corresponding Japanese Patent Application No. 2017-175723, dated Mar. 5, 2019, with English Translation.

*Primary Examiner* — Behrang Badii
*Assistant Examiner* — Jalal C Coduroglu
(74) *Attorney, Agent, or Firm* — McDermott Will & Emery LLP

(57) ABSTRACT

A traveling control apparatus of vehicle includes a traveling controller, a position detector, and a steering torque detector. Where a steering torque, upon operation of a steering wheel to orient a vehicle in a first direction parallel to a width direction of a first lane, is a positive value, and the steering torque, upon operation of the steering wheel to orient the vehicle in a second direction opposite to the first direction, is a negative value, a lane change controller of the traveling controller stops a lane change control when the steering torque is equal to or greater than a positive first threshold or is equal to or less than a negative second threshold. The traveling controller varies the first and the second thresholds in accordance with a deviation that is an amount in which the vehicle is shifted from an imaginary curve related to a target course.

15 Claims, 5 Drawing Sheets

(51) Int. Cl.
*B60W 50/10* (2012.01)
*B62D 15/02* (2006.01)
*B62D 1/28* (2006.01)
*B60W 30/16* (2020.01)

(52) U.S. Cl.
CPC ......... *B62D 15/0255* (2013.01); *B60W 30/16* (2013.01); *B60W 2540/18* (2013.01); *G08G 1/167* (2013.01)

(58) Field of Classification Search
CPC ... B60W 30/10; B62D 15/0255; B62D 1/286; B62D 5/0463; B62D 6/00
See application file for complete search history.

(56) References Cited

U.S. PATENT DOCUMENTS

| | | | | |
|---|---|---|---|---|
| 4,840,247 A * | 6/1989 | Kashihara | ......... | B60K 23/0808 180/197 |
| 4,965,583 A * | 10/1990 | Broxmeyer | ......... | G01S 13/931 342/42 |
| 4,989,686 A * | 2/1991 | Miller | ......... | B60K 23/0808 180/197 |
| 5,005,687 A * | 4/1991 | Kurihara | ......... | B60K 25/00 192/92 |
| 5,125,668 A * | 6/1992 | Welte | ......... | A63H 17/006 124/29 |
| 5,170,352 A * | 12/1992 | McTamaney | ......... | G05D 1/0236 318/587 |
| 5,513,720 A * | 5/1996 | Yamamoto | ......... | B62D 6/02 180/421 |
| 6,053,270 A * | 4/2000 | Nishikawa | ......... | B60R 21/2037 180/168 |
| 6,155,377 A * | 12/2000 | Tokunaga | ......... | B62D 1/166 180/446 |
| 6,189,317 B1 * | 2/2001 | Yasui | ......... | B60K 6/42 60/284 |
| 6,970,777 B2 * | 11/2005 | Tange | ......... | B60T 8/17557 701/41 |
| 8,063,754 B2 * | 11/2011 | Tanida | ......... | B60Q 9/00 340/435 |
| 9,061,630 B2 * | 6/2015 | Takiguchi | ......... | B60K 26/02 |
| 9,751,534 B2 * | 9/2017 | Fung | ......... | G06K 9/00892 |
| 9,764,640 B2 * | 9/2017 | Matsuno | ......... | B62D 6/00 |
| 9,776,641 B2 * | 10/2017 | Matsuno | ......... | B60W 50/0225 |
| 9,789,905 B2 * | 10/2017 | Matsuno | ......... | B62D 15/025 |
| 9,809,164 B2 * | 11/2017 | Matsuno | ......... | B60Q 9/00 |
| 9,889,884 B2 * | 2/2018 | Matsuno | ......... | B60W 30/18163 |
| 9,990,375 B2 * | 6/2018 | Mizoguchi | ......... | G06F 16/29 |
| 10,501,116 B2 * | 12/2019 | Mizoguchi | ......... | B62D 5/0481 |
| 10,525,973 B2 * | 1/2020 | Mizoguchi | ......... | B60W 40/072 |
| 2003/0078712 A1 * | 4/2003 | Shimakage | ......... | B62D 15/025 701/41 |
| 2004/0195037 A1 * | 10/2004 | Otaki | ......... | B62D 5/065 180/421 |
| 2005/0043867 A1 * | 2/2005 | Kudo | ......... | B62D 1/286 701/23 |
| 2005/0240328 A1 * | 10/2005 | Shirato | ......... | B62D 1/286 701/41 |
| 2008/0103668 A1 * | 5/2008 | Kamikado | ......... | B60T 8/246 701/70 |
| 2011/0251758 A1 * | 10/2011 | Kataoka | ......... | B62D 15/025 701/41 |
| 2012/0029773 A1 * | 2/2012 | Fujita | ......... | B62D 6/00 701/41 |
| 2012/0123643 A1 * | 5/2012 | Limpibuntering | ..... | B62D 1/286 701/42 |
| 2013/0060413 A1 * | 3/2013 | Lee | ......... | B62D 1/286 701/23 |
| 2013/0060414 A1 * | 3/2013 | Lee | ......... | B62D 15/025 701/23 |
| 2014/0257628 A1 * | 9/2014 | Lee | ......... | B62D 5/0481 701/34.4 |
| 2016/0001781 A1 * | 1/2016 | Fung | ......... | G16H 50/20 701/36 |
| 2016/0001814 A1 * | 1/2016 | Endo | ......... | B62D 5/0463 701/41 |
| 2016/0069317 A1 * | 3/2016 | Koibuchi | ......... | F02N 11/0833 701/112 |
| 2016/0229403 A1 * | 8/2016 | Khafagy | ......... | B60W 10/26 |
| 2016/0320776 A1 * | 11/2016 | Inami | ......... | F01P 7/16 |
| 2017/0008522 A1 * | 1/2017 | Sato | ......... | B60W 30/095 |
| 2017/0017233 A1 * | 1/2017 | Ichikawa | ......... | B60W 40/00 |
| 2017/0029021 A1 * | 2/2017 | Lee | ......... | G05D 1/0088 |
| 2017/0210413 A1 * | 7/2017 | Tsujioka | ......... | B62D 5/0463 |
| 2017/0210415 A1 * | 7/2017 | Whittle | ......... | B62D 15/029 |
| 2017/0225685 A1 * | 8/2017 | Aoki | ......... | B60Q 1/40 |
| 2017/0232973 A1 * | 8/2017 | Otake | ......... | B60W 50/14 701/43 |
| 2017/0240177 A1 * | 8/2017 | Fujii | ......... | B62D 15/025 |
| 2018/0074492 A1 * | 3/2018 | Yamamoto | ......... | B60W 10/20 |
| 2018/0186372 A1 * | 7/2018 | Shimizu | ......... | B60W 50/085 |
| 2018/0339727 A1 * | 11/2018 | Ueyama | ......... | B62D 5/065 |
| 2018/0354513 A1 * | 12/2018 | Moshchuk | ......... | B62D 15/025 |
| 2019/0047621 A1 * | 2/2019 | Kim | ......... | B62D 15/025 |

FOREIGN PATENT DOCUMENTS

| | | |
|---|---|---|
| JP | 2010-030387 A | 2/2010 |
| JP | 5370931 B2 | 12/2013 |
| JP | 2017-138899 A | 8/2017 |
| JP | 2017-149179 A | 8/2017 |

* cited by examiner

TRAVELING CONTROL APPARATUS OF VEHICLE

CROSS-REFERENCE TO RELATED APPLICATIONS

The present application claims priority from Japanese Patent Application No. 2017-175723 filed on Sep. 13, 2017, the entire contents of which are hereby incorporated by reference.

BACKGROUND

The technology relates to a traveling control apparatus of vehicle which executes an automatic driving control.

Techniques related to a lane keeping control under which an own vehicle is kept in a lane have been recently developed and put into practical use for vehicles such as automobiles. Techniques related to a lane change control under which an own vehicle moves from a lane to its adjoining lane have also been developed.

Systems that execute an automatic driving control including the lane keeping control and the lane change control are equipped with an override function that, for example, when a driver performs a predetermined driving operation during execution of the automatic driving control, stops the automatic driving control and switches from the automatic driving control to driver's manual driving, in order to give priority to a driver's intention. For example, Japanese Unexamined Patent Application Publication (JP-A) No. 2017-138899 discloses a technique that, when a driver applies a steering torque equal to or greater than a preset value to a steering wheel of a vehicle, cancels the lane change control.

Japanese Patent (JP-B) No. 5370931 discloses a technique that, when an amount in which a center of a vehicle is shifted from a center of a lane becomes equal to or greater than a preset threshold, stops a lane departure prevention assist process. This technique estimates a driver's intention to change lanes, depending on a magnitude of a steering torque and changes a timing of stopping the lane departure prevention assist process.

SUMMARY

A request has arisen for a traveling control apparatus of vehicle which stops a lane change control by estimating a driver's intention appropriately.

It is desirable to provide a traveling control apparatus of vehicle which is able to stop a lane change control by estimating a driver's intention appropriately.

An aspect of the technology provides a traveling control apparatus of vehicle. The traveling control apparatus includes: a traveling controller configured to control a vehicle to automatically run along a target course; a position detector configured to detect a position of the vehicle; and a steering torque detector that detects a steering torque applied to a steering wheel by a driver. The traveling controller includes a lane change controller configured to execute a lane change control under which the vehicle changes lanes from a first lane, along which the vehicle runs, to a second lane adjoining to the first lane, and a deviation calculator that calculates a deviation on a basis of the position of the vehicle, in which the deviation is an amount in which the vehicle is shifted from an imaginary curve that is related to the target course. Where the steering torque, upon operation of the steering wheel to orient the vehicle in a first direction, is expressed as a positive value, and where the steering torque, upon operation of the steering wheel to orient the vehicle in a second direction, is expressed as a negative value, the lane change controller stops the lane change control when the steering torque is equal to or greater than a first threshold having the positive value or when the steering torque is equal to or less than a second threshold having the negative value, in which the first direction is a direction parallel to a width direction of the first lane, and the second direction is a direction opposite to the first direction. The traveling controller is configured to vary the first threshold and the second threshold in accordance with the deviation.

An aspect of the technology provides a traveling control apparatus of vehicle. The traveling control apparatus includes: a position detector configured to detect a position of a vehicle; a steering torque detector configured to detect a steering torque applied to a steering wheel by a driver; and circuitry configured to control the vehicle to automatically run along a target course, execute a lane change control under which the vehicle changes lanes from a first lane, along which the vehicle runs, to a second lane adjoining to the first lane, calculate a deviation on a basis of the position of the vehicle, in which the deviation is an amount in which the vehicle is shifted from an imaginary curve that is related to the target course, stop, where the steering torque, upon operation of the steering wheel to orient the vehicle in a first direction, is expressed as a positive value, and where the steering torque, upon operation of the steering wheel to orient the vehicle in a second direction, is expressed as a negative value, the lane change control when the steering torque is equal to or greater than a first threshold having the positive value or when the steering torque is equal to or less than a second threshold having the negative value, in which the first direction is a direction parallel to a width direction of the first lane, and the second direction is a direction opposite to the first direction, and vary the first threshold and the second threshold in accordance with the deviation.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In general, to make an override determination using a steering torque, a threshold used for this override determination is set to a considerably high value in order to prevent an automatic driving control from being disabled due to disturbance, such as unintentional contact of a driver's arm or leg. However, if a high threshold is used in a technique disclosed in JP-A No. 2017-138899, a steering torque that is necessary for the override becomes relatively higher. As a result, a driver may experience a strong feeling of strangeness.

To reduce the above strangeness, it is important to estimate a driver's intention. However, it is difficult to apply a technique disclosed in JP-B No. 5370931 to a lane change control under which a vehicle moves between two lanes, because this technique stops the lane departure prevention assist process by using a lateral shift amount relative to a lane in which a vehicle is running.

It is therefore desirable to estimate a driver's intention and mitigate strangeness when stopping a lane change control.

Figure 1:
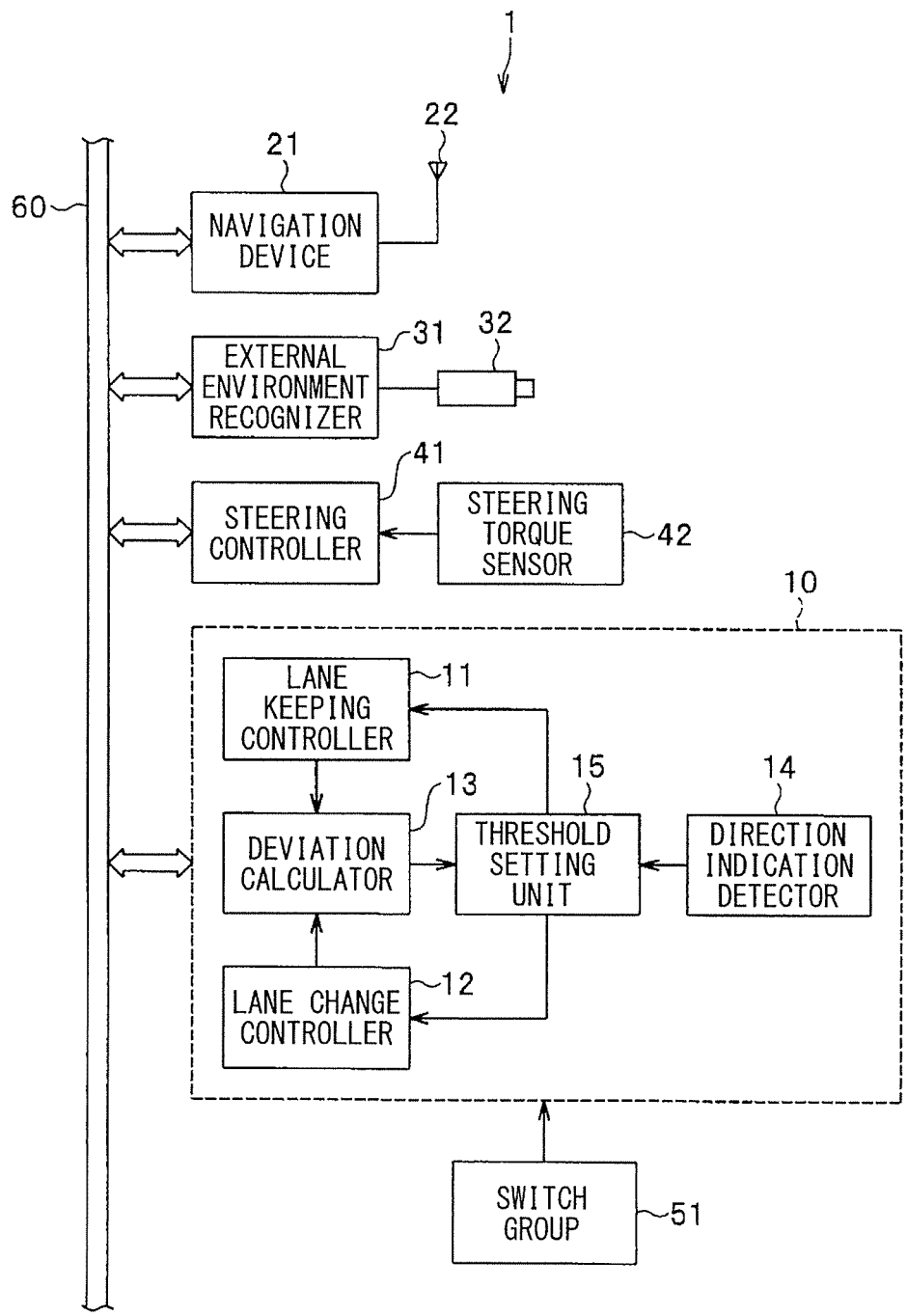
FIG. 1 illustrates an example of a configuration of a traveling control apparatus of vehicle according to one implementation of the technology.

With reference to FIG. 1, first, a description is given of a configuration of a traveling control apparatus of vehicle according to an example implementation of the technology. FIG. 1 illustrates an example of the configuration of the traveling control apparatus of vehicle.

Referring to FIG. 1, a traveling control apparatus 1 may include a traveling controller 10, a navigation device 21, an external environment recognizer 31, and a steering controller 41. The traveling controller 10, the navigation device 21, the external environment recognizer 31, and the steering controller 41 may be coupled to one another via a communication bus 60, which may form an on-vehicle network.

The traveling controller 10 may be a controller that executes main controls of a vehicle. In an example implementation, the main controls may include an automatic driving control under which the vehicle automatically runs along a target course. Non-limiting examples of controls executed by the traveling controller 10 may include: an engine control under which an operational state of an engine in the vehicle is controlled; a brake control under which a brake for four wheels is controlled; and a steering control under which an electric power steering motor provided in a steering system of the vehicle is controlled.

The navigation device 21 may include a receiver 22 and an unillustrated storage. The receiver 22 may receive position information from a positioning satellite, for example, in a global navigation satellite system (GNSS), such as a global positioning system (GPS). The storage may store road map information. On the basis of the position information that the receiver 22 has received from the positioning satellite, the navigation device 21 may acquire vehicle position information that indicates, for example, coordinates such as latitude or longitude. In addition, on the basis of the vehicle position information and road map information, the navigation device 21 may acquire information regarding road geometries, such as curvatures, lane widths, and shoulder widths of a road on which the vehicle is running and its adjoining road. Those pieces of information may be outputted to the traveling controller 10, an unillustrated display device, or other device via the communication bus 60.

The external environment recognizer 31 may have functions of recognizing an external environment of the vehicle. Specific but not-limiting examples of the functions of recognizing the external environment of the vehicle may include: a function of recognizing a lane line (i.e., a lane definition line) such as a white line or any other colored line of a road on which the vehicle is running; and a function of recognizing presence, a position, and motion of an object on or around the road. The external environment of the vehicle may be recognized by a sensor coupled to the external environment recognizer 31. In an example implementation, a camera device 32, such as a stereo camera, a monocular camera, or a color camera, may be used as the sensor. When the camera device 32 is used, the external environment recognizer 31 may recognize the external environment by subjecting an image captured by the camera device 32 to image processing, for example. A result of recognizing the external environment may be outputted to the traveling controller 10 via the communication bus 60. In an example implementation, the sensor is not limited to the camera device 32. In an alternative example implementation, a radar system such as millimeter wave radar or LiDAR may be used.

In one implementation, the navigation device 21 and the external environment recognizer 31 may serve as a "position detector". The position of the vehicle may be detected on the basis of one or both of the information acquired by the navigation device 21 and the recognized result of the external environment recognizer 31. In a specific but non-limiting example implementation, the navigation device 21 and the external environment recognizer 31 may detect the lane line by using the recognized result of the external environment recognizer 31 and calculate a distance between the vehicle and the lane line, thereby detecting the position of the vehicle running on the road.

On the basis of the information acquired by the navigation device 21 and the recognized result of the external environment recognizer 31, the traveling controller 10 may execute drive assist controls, such as a collision prevention control for preventing a contact with an obstacle or other object, a constant speed traveling control, a follow-up traveling control, the lane keeping control, a lane departure prevention control, and the lane change control. In addition, the traveling controller 10 may execute an automatic driving control in which these controls are executed in collaboration with one another.

The traveling control apparatus 1 may further include a steering torque sensor 42 that detects a steering torque that the driver applies to the steering wheel. The steering torque sensor 42 may be coupled to the steering controller 41. In one implementation, the steering torque sensor 42 may serve as a "steering torque detector". The steering controller 41 may control the electric power steering motor in accordance with the steering torque detected by the steering torque sensor 42. During the execution of the automatic driving control including the lane keeping control and the lane change control, the steering controller 41 may control the electric power steering motor in such a way that the vehicle automatically runs along the target course, on the basis of a steering control signal outputted from the traveling controller 10.

The traveling controller 10 may be coupled to a switch group 51 used for various settings and operations. The switch group 51 may include: a turn signal switch for use in turning on/off direction indicators; switches for use in enabling/disabling the constant speed traveling control, the follow-up traveling control, the lane keeping control, the lane departure prevention control, and the lane change control; a switch for use in enabling or disabling the automatic driving control in which the controls are executed in collaboration with one another; and switches for use in setting a vehicle speed, an inter-vehicle distance, an inter-vehicle time, a speed limit, and other parameters.

Next, the traveling controller 10 is described in detail with reference to FIG. 1. The traveling controller 10 may include a lane keeping controller 11 and a lane change controller 12. Hereinafter, a lane in which the own vehicle is currently running is referred to as a first lane, and a lane adjoining to the first lane is referred to as a second lane. The lane keeping controller 11 may execute the lane keeping control under which the vehicle is kept in the first lane. The lane change controller 12 may execute the lane change control under which the vehicle performs the lane changing from the first lane to the second lane.

For example, the lane change controller 12 may start executing the lane change control when the driver turns on the switch for use in executing the lane change control during the execution of the lane keeping control. In response to the turn-on of this switch, the lane keeping control may be stopped (e.g., suspended), and in turn the lane change control may be executed. After the vehicle has completed the lane changing by moving from the first lane to the second lane, the lane change control may be terminated, and in turn the lane keeping control may be resumed. Under the resumed lane keeping control, the second lane to which the vehicle has moved may be recognized as the first lane.

There are cases where even if the driver turns on the switch in the above manner, the lane change control is not executed. Non-limiting examples of such cases may include: a case where the external environment recognizer 31 recognizes presence of another vehicle in the second lane; and a case where the second lane is not recognized. In these cases, the lane keeping controller 11 may continue to execute the lane keeping control.

The traveling controller 10 may further include a deviation calculator 13. Herein, an amount in which the vehicle is shifted from an imaginary curve related to the target course is defined as a deviation D. In an example implementation, the deviation D may represent an amount of shift from the imaginary curve in a width direction of the first lane. The deviation calculator 13 may calculate the deviation D on the basis of the vehicle position information.

In an example implementation, during the execution of the lane keeping control, the imaginary curve may be set to a central line of the first lane. During the execution of the lane change control, the imaginary curve may be set to a trajectory, and may intersect a border between the first lane and the second lane. The trajectory may be formed by target points of the position of the vehicle when the vehicle changes lanes. Both the lane keeping controller 11 and the lane change controller 12 may calculate the imaginary curve by using one or both of the information acquired by the navigation device 21 and the recognized result of the external environment recognizer 31.

The deviation calculator 13 may acquire information regarding the imaginary curve calculated by both the lane keeping controller 11 and the lane change controller 12 and the position information of the vehicle which is detected using one or both of the navigation device 21 and the external environment recognizer 31, and may thereby calculate the deviation D. In an example implementation, the position of the vehicle may be a central position of the vehicle in its width and longitudinal directions.

In an example implementation, one direction parallel to a width direction of the first lane is defined as a first direction D1, and a direction opposite to the first direction D1 is defined as a second direction D2. The first direction D1 and the second direction D2 are illustrated in FIGS. 4, 5, 8, and 9 that are referenced later. When the vehicle is shifted from the imaginary curve in the first direction D1, the deviation D may be expressed as a positive value. When the vehicle is shifted from the imaginary curve in the second direction D2, the deviation D may be expressed as a negative value. When the driver operates the steering wheel in such a way the vehicle is oriented in the first direction D1, the steering torque detected by the steering torque sensor 42 may be expressed as a positive value. When the driver operates the steering wheel in such a way the vehicle is oriented in the second direction D2, the steering torque detected by the steering torque sensor 42 may be expressed as a negative value.

In an example implementation, the traveling controller 10 may perform an override determination process by which the lane keeping control or the lane change control is stopped and switched to the manual driving, on the basis of the steering torque. The lane keeping controller 11 may acquire the steering torque detected by the steering torque sensor 42. When the detected steering torque is equal to or greater than a third threshold TH3 (0<TH3) or is equal to or less than a fourth threshold TH4 (TH4<0), the lane keeping controller 11 may stop the lane keeping control. Likewise, the lane change controller 12 may acquire the steering torque detected by the steering torque sensor 42. When the detected steering torque is equal to or greater than a first threshold TH1 (0<TH1) or is equal to or less than a second threshold TH2 (TH2<0), the lane change controller 12 may stop the lane change control.

The traveling controller 10 may further include a direction indication detector 14 and a threshold setting unit 15. The direction indication detector 14 may detect an operational state of direction indicators provided in the vehicle. The threshold setting unit 15 may set the first threshold TH1, the second threshold TH2, the third threshold TH3, and the fourth threshold TH4. The threshold setting unit 15 may acquire the deviation D calculated by the deviation calculator 13, and may vary the first threshold TH1 and the second threshold TH2 in accordance with the deviation D. Likewise, the threshold setting unit 15 may acquire the deviation D calculated by the deviation calculator 13 and information on the operational state of the direction indicators detected by the direction indication detector 14, and may vary the third threshold TH3 and the fourth threshold TH4 in accordance with the deviation D and the operational state of the direction indicators.

The threshold setting unit 15 may be an optional component of the traveling controller 10 and thus does not necessarily have to be provided in the traveling controller 10. In which case, a plurality of values related to the first threshold TH1 to the fourth threshold TH4 may be stored in the unillustrated storage. The lane keeping controller 11 may acquire the deviation D calculated by the deviation calculator 13 and the information on the operational state of the direction indicators detected by the direction indication detector 14. Further, the lane keeping controller 11 may acquire a plurality of values related to the third threshold TH3 and the fourth threshold TH4 in accordance with the deviation D and the operational state of the direction indicators. Likewise, the lane change controller 12 may acquire the deviation D calculated by the deviation calculator 13, and may acquire a plurality of values related to the first threshold TH1 and the second threshold TH2 from the unillustrated storage in accordance with the deviation D. A description on these values will be given later in greater detail.

Non-limiting examples of a case where the override is performed to stop the lane keeping control may include: a case where, in a situation where the lane change control is not executed although the driver turns on the switch for the lane change control, the driver attempts to change lanes by means of the manual driving; and a case the vehicle moves from a main road, for example, on a highway to a branch road. Non-limiting examples of a case where the override is performed to stop the lane change control may include: a case where the driver attempts to interrupt and thus stop the lane changing because a timing of starting to change the lanes differs from a timing that the driver expects; and a case where the driver attempts to change the lanes by means of the manual driving.

Figure 2:
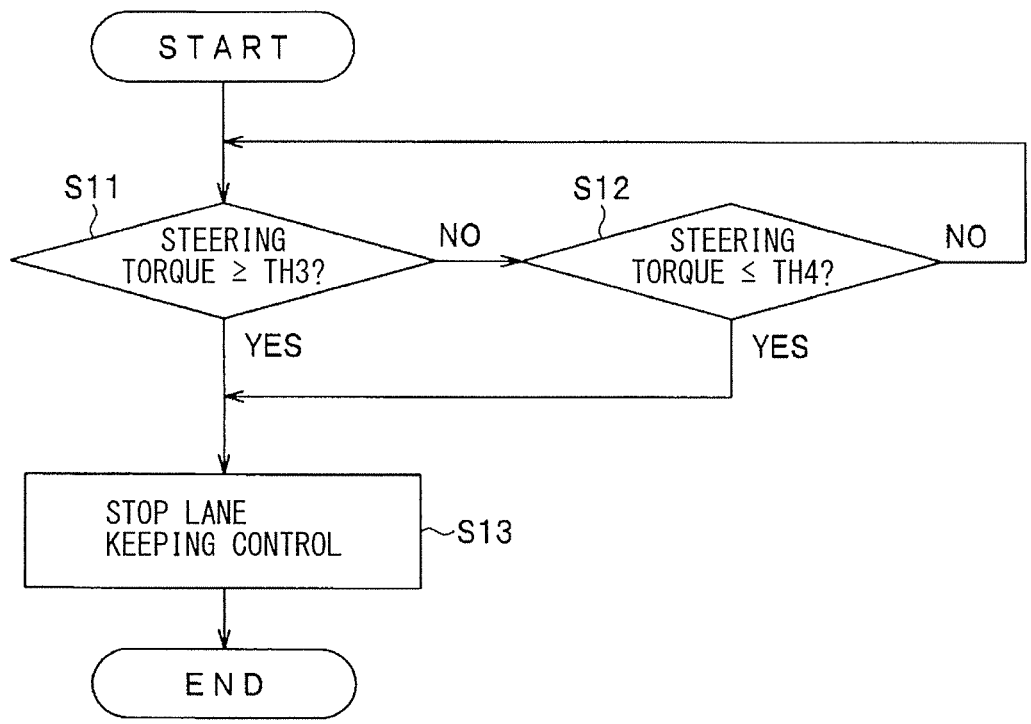
FIG. 2 is a flowchart illustrating an example of an override determination process for a lane keeping control according to one implementation of the technology.
Figure 3:
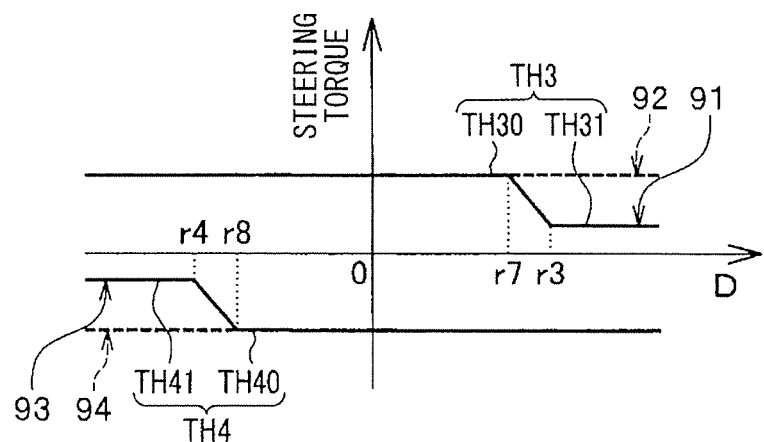
FIG. 3 schematically illustrates a third threshold and a fourth threshold according to one implementation of the technology.

With reference to FIGS. 2 and 3, a description is given in detail of the override determination process for the lane keeping control, the third threshold TH3, and the fourth threshold TH4. FIG. 2 is a flowchart illustrating an example of the override determination process for the lane keeping control. FIG. 3 schematically illustrates the third threshold TH3 and the fourth threshold TH4. The override determination process for the lane keeping control may be performed by the lane keeping controller 11 during the execution of the lane keeping control.

In the override determination process for the lane keeping control, first, the lane keeping controller 11 may determine whether the steering torque is equal to or greater than the third threshold TH3 in step S11. When the steering torque is equal to or greater than the third threshold TH3 (step S11: "YES"), the lane keeping controller 11 may stop the lane keeping control at step S13. When the steering torque is less than the third threshold TH3 (step S11: "NO"), the lane keeping controller 11 may determine whether the steering torque is equal to or less than the fourth threshold TH4 at step S12. When the steering torque is equal to or less than the fourth threshold TH4 (step S12: "YES"), the lane keeping controller 11 may stop the lane keeping control at step S13. When the steering torque is greater than the fourth threshold TH4 (step S12: "NO"), the processing may return to step S11.

In an example implementation, as described above, each of the third threshold TH3 and the fourth threshold TH4 may vary depending on the deviation D and the operational state of the direction indicators. With reference to FIG. 3, a description is given below of the third threshold TH3 and the fourth threshold TH4. In FIG. 3, the third threshold TH3 used when the direction indicators indicate the first direction D1 is represented by a solid line denoted by numeral 91, whereas the third threshold TH3 used when the direction indicators do not indicate the first direction D1 is represented by a broken line denoted by numeral 92. In an example implementation, when the deviation D is equal to or greater than a third reference value r3 (0<r3) and the direction indicators indicate the first direction D1 as well, the third threshold TH3 may be set to a constant value TH31 (0<TH31), which is less than the third threshold TH3 for the other cases.

The above "other cases" may include: a case, referred to below as a "first case", where the direction indicators do not indicate the first direction D1; and a case where the deviation D is less than the third reference value r3 and the direction indicators indicates the first direction D1 as well. In an example implementation, especially the latter cases may include: a case, referred to below as a "second case", where the deviation D is equal to or less than a reference value r7 (0<r7<r3); and a case, referred to below as a "third case", where the deviation D is greater than the reference value r7 but less than the third reference value r3. In the first case and the second case, the third threshold TH3 may be set to a constant value TH30 (TH31<TH30), independently of a value of the deviation D. In the third case, the third threshold TH3 may be set to greater than the value TH3l but less than the value TH30 and decrease with an increase of the deviation D.

In FIG. 3, the fourth threshold TH4 used when the direction indicators indicate the second direction D2 is represented by a solid line denoted by numeral 93, whereas the fourth threshold TH4 used when the direction indicators do not indicate the second direction D2 is represented by a broken line denoted by numeral 94. In an example implementation, when the deviation D is equal to or less than a fourth reference value r4 (r4<0) and the direction indicators indicate the second direction D2 as well, the fourth threshold TH4 may be set to a constant value TH41 (TH41<0), which is greater than the fourth threshold TH4 for the other cases.

The above "other cases" may include: a case, referred to below as a "fourth case", the direction indicators do not indicate the second direction D2; and a case where the deviation D is greater than the fourth reference value r4 and the direction indicators indicate the second direction D2 as well. In an example implementation, especially the latter cases may further include: a case, referred to below as a "fifth case", where the deviation D is equal to or greater than a reference value r8 (r4<r8<0); and a case, referred to below as a "sixth case", where the deviation D is greater than the fourth reference value r4 but less than the reference value r8. In the fourth case and the fifth case, the fourth threshold TH4 may be a constant value TH40 (TH40<TH41), independently of a value of the deviation D. In the sixth case, the fourth threshold TH4 may be set to greater than the value TH40 but less than the value TH41 and decrease with an increase in the deviation D.

Figure 4:
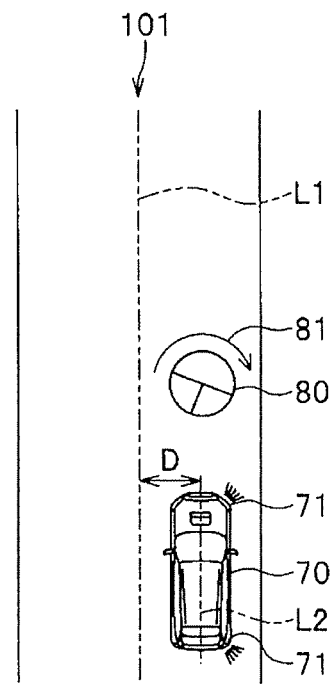
FIG. 4 illustrates an example of a state of a vehicle during execution of the lane keeping control according to one implementation of the technology.
Figure 5:
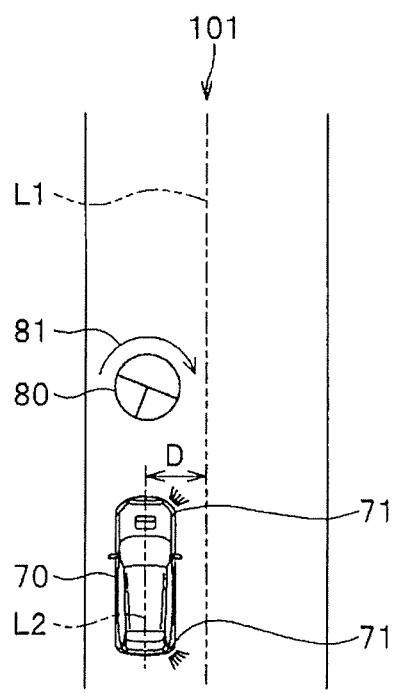
FIG. 5 illustrates another example of the state of the vehicle during the execution of the lane keeping control according to one implementation of the technology.

FIGS. 4 and 5 each illustrate a state of the vehicle during the execution of the lane keeping control. In each of FIGS. 4 and 5, the first direction D1 represents a rightward direction, whereas the second direction D2 represents a leftward direction. In each of FIGS. 4 and 5, the vehicle is denoted by numeral 70, the direction indicators are denoted by numeral 71, the steering wheel is denoted by numeral 80, and the first lane is denoted by numeral 101. An arrow denoted by numeral 81 indicates an operational direction of the steering wheel 80. The imaginary curve related to the target course is denoted by numeral L1. In each of FIGS. 4 and 5, the imaginary curve L1 is a central line of the first lane 101. A straight line denoted by numeral L2 represents a central line of the vehicle 70 in its width direction.

FIG. 4 illustrates a case where the vehicle 70 is shifted from the imaginary curve L1, or the "central line", in the first direction D1. In this case, when the direction indicators 71 indicate the first direction D1 and the driver operates the steering wheel 80 in such a way that the vehicle 70 is oriented in the first direction D1, it is possible to reliably estimate that the driver attempts to perform the override and move the vehicle 70 in the first direction D1. In an example implementation, in any case where it is possible to reliably estimate a driver's intention to move the vehicle 70 in the first direction D1 as described above, the third threshold TH3 may be set to a lower value when the deviation D is equal to or greater than the third reference value r3. Setting the third threshold TH3 in this manner makes it easier to stop the lane keeping control.

In an unillustrated case where the vehicle 70 is shifted from the imaginary curve L1, or the "central line", in the second direction D2, when the direction indicators 71 indicate the second direction D2 and the driver operates the steering wheel 80 in such a way that the vehicle 70 is oriented in the second direction D2, it is possible to reliably estimate that the driver attempts to perform the override and move the vehicle 70 in the second direction D2. In an example implementation, in any case where it is possible to reliably estimate a driver's intention to move the vehicle 70 in the second direction D2 as described above, the fourth threshold TH4 may be set to a higher value when the deviation D is equal to or less than the fourth reference value r4. Setting the fourth threshold TH4 in this manner makes it easier to stop the lane keeping control.

FIG. 5 illustrates a case where the vehicle 70 is shifted from the imaginary curve L1, or the "central line", in the second direction D2. In this case, even if the driver operates the steering wheel 80 in such a way that the vehicle 70 is oriented in the first direction D1, it is unclear whether the driver attempts to override the lane keeping control or maintain the lane keeping control by correcting the position of the vehicle 70. Likewise, in a case where the vehicle 70 is shifted from the imaginary curve L1, or the "central line", in the first direction D1, even if the drivers operate the steering wheel 80 in such a way that the vehicle 70 is oriented in the second direction D2, it is unclear whether the driver attempts to override the lane keeping control or maintain the lane keeping control by correcting the position of the vehicle 70. In an example implementation, when it is difficult to reliably estimate a driver's intention as in the above cases, the third threshold TH3 may be maintained at a higher value, namely, at the value TH30, or the fourth threshold TH4 may be maintained at a lower value, namely, at the value TH40. The suspension of the lane keeping control is thereby made more difficult in these cases than in a case where it is possible to reliably estimate the driver's intention.

In an example implementation, the values TH30, TH31, TH40, and TH41 and the reference values r3, r4, r7, and r8 may be a plurality of values related to the third threshold TH3 and the fourth threshold TH4. These values may be set by the threshold setting unit 15 or stored in the unillustrated storage.

Figure 6:
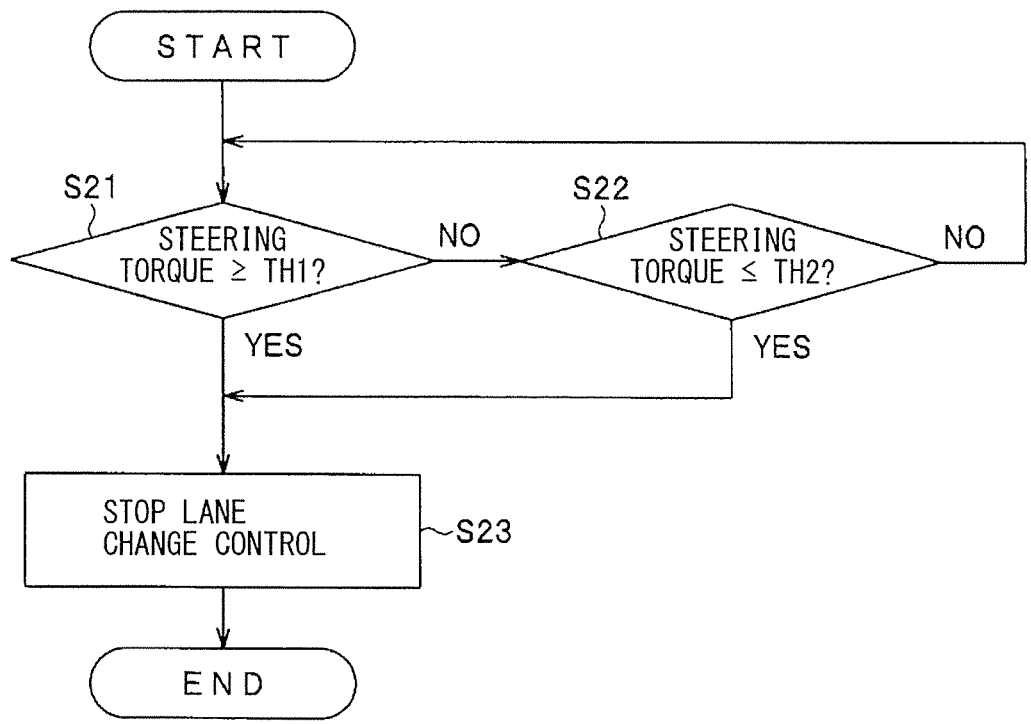
FIG. 6 is a flowchart illustrating an example of an override determination process for a lane change control according to one implementation of the technology.
Figure 7:
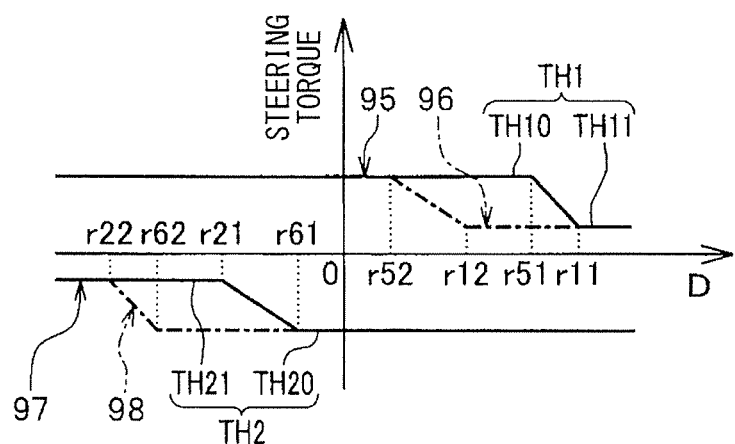
FIG. 7 schematically illustrates a first threshold and a second threshold according to one implementation of the technology.

With reference to FIGS. 6 and 7, a description is given in detail of the override determination process for the lane change control, the first threshold TH1, and the second threshold TH2. FIG. 6 is a flowchart illustrating an example of the override determination process for the lane change control. FIG. 7 schematically illustrates the first threshold TH1 and the second threshold TH2. The override determination process for the lane change control may be performed by the lane change controller 12 during the execution of the lane change control.

In the override determination process for the lane change control, first, the lane change controller 12 may determine whether the steering torque is equal to or greater than the first threshold TH1 at step S21. When the steering torque is equal to or greater than the first threshold TH1 (step S21: "YES"), the lane change controller 12 may stop the lane change control at step S23. When the steering torque is less than the first threshold TH1 (step S21: "NO"), the lane change controller 12 may determine whether the steering torque is equal to or less than the second threshold TH2 at step S22. When the steering torque is equal to or less than the second threshold TH2 (step S22: "YES"), the lane change controller 12 may stop the lane change control at step S23. When the steering torque is greater than the second threshold TH2 (step S22: "NO"), the processing may return to step S21.

In an example implementation, as described above, each of the first threshold TH1 and the second threshold TH2 may vary depending on the deviation D. With reference to FIG. 7, a description is given below of the first threshold TH1 and the second threshold TH2. In FIG. 7, the first threshold TH1 used when the second lane is present in the first direction D1 with respect to the first lane, namely, when the vehicle changes the lanes in the first direction D1 is represented by a solid line denoted by numeral 95. The first threshold TH1 used when the second lane is present in the second direction D2 with respect to the first lane, namely, when the vehicle changes the lanes in the second direction D2 is represented by an alternate long and short dash line denoted by numeral 96.

In an example implementation, when the deviation D is equal to or greater than a first reference value that is a positive value, the first threshold TH1 may be set to a constant value TH11 (0<TH11), which is less than the first threshold TH1 for the other cases. In an implementation, the first reference value used when the vehicle changes the lanes in the first direction D1 (see numeral 95) and the first reference value used when the vehicle changes the lanes in the second direction D2 (see numeral 96) may be made different from each other, i.e., the first reference value may vary depending on whether the vehicle changes the lanes in the first direction D1 (see numeral 95) or in the second direction D2 (see numeral 96). Hereinafter, the first reference value used when the vehicle changes the lanes in the first direction D1 is denoted by a mark r11 (0<r11), whereas the first reference value used when the vehicle changes the lanes in the second direction D2 is denoted by a mark r12 (0<r12). The first reference value r11 used when the vehicle changes the lanes in the first direction D1 may be set to be greater than the first reference value r12 used when the vehicle changes the lanes in the second direction D2.

The above "other cases" regarding the change in the lanes in the first direction D1 (see numeral 95) may include cases where the deviation D is less than the first reference value r11. In an example implementation, especially the cases where the deviation D is less than the first reference value r11 may include: a case where the deviation D is equal to or less than a reference value r51 (0<r51<r11); and a case where the deviation D is greater than the reference value r51 but less than the first reference value r11. The first threshold TH1 in the former case may be set to a constant value TH10 (TH11<TH10) independently of a value of the deviation D. The first threshold TH1 in the latter case may be set to be greater than the value TH11 but less than the value TH10 and decrease with an increase in the deviation D.

The above "other cases" regarding the change in the lanes in the second direction D2 (see numeral 96) may include cases where the deviation D is less than the first reference value r12. In an example implementation, especially the cases where the deviation D is less than the first reference value r12 may include: a case where the deviation D is equal to or less than a reference value r52 (0<r52<r12); and a case where the deviation D is greater than the reference value r52 but less than the first reference value r12. The first threshold TH1 in the former case may be set to the constant value TH10 independently of a value of the deviation D. The first threshold TH1 in the latter case may be set to be greater than the value TH11 but less than the value TH10 and decrease with an increase in the deviation D.

In FIG. 7, a second threshold TH2 used when the vehicle changes the lanes in the first direction D1 is indicated by a solid line denoted by numeral 97. The second threshold TH2 used when the vehicle changes the lanes in the second direction D2 is indicated by an alternate long and short dash line denoted by numeral 98.

In an example implementation, when the deviation D is equal to or less than a second reference value that is a negative value, the second threshold TH2 may be set to a constant value TH21 (TH21<0), which is greater than the second threshold TH2 for the other cases. In an example implementation, the second reference value used when the vehicle changes the lanes in the first direction D1 (see numeral 97) and the second reference value used when the vehicle changes the lanes in the second direction D2 (see numeral 98) may be made different from each other, i.e., the second reference value may vary depending on whether the vehicle changes the lanes in the first direction D1 (see numeral 97) or in the second direction D2 (see numeral 98). Hereinafter, the second reference value used when the vehicle changes the lanes in the first direction D1 is denoted by a mark r21 (r21<0), whereas the second reference value used when the vehicle changes the lanes in the second direction D2 is denoted by a mark r22 (r22<0). The second reference value r21 used when the vehicle changes the lanes in the first direction D1 may be set to be greater than the second reference value r22 used when the vehicle changes the lanes in the second direction D2.

The "above other" cases regarding the change in the lanes in the first direction D1 (see numeral 97) may include cases where the deviation D is greater than the second reference value r21. In an example implementation, especially the cases where the deviation D is greater than the second reference value r21 may include: a case where the deviation D is equal to or greater than a reference value r61 (r21<r61<0); and a case where the deviation D is greater than the second reference value r21 but less than the reference value r61. The second threshold TH2 in the former case may be set to a constant value TH20 (TH20<TH21) independently of a value of the deviation D. The second threshold TH2 in the latter case may be set to be greater than the value TH20 but less than the value TH21 and decrease with an increase in the deviation D.

The above "other cases" regarding the change in the lanes in the second direction D2 (see numeral 98) may include cases where the deviation D is greater than the second reference value r22. In an example implementation, especially the cases where the deviation D is greater than the second reference value r22 may include: a case where the deviation D is equal to or greater than a reference value r62 (r22<r62<0); and a case where the deviation D is greater than the second reference value r22 but less than the reference value r62. The second threshold TH2 in the former case may be set to the constant value TH20 independently of a value of the deviation D. The second threshold TH2 in the latter case may be set to be greater than the value TH20 but less than the value TH21 and decrease with an increase in the deviation D.

Figure 8:
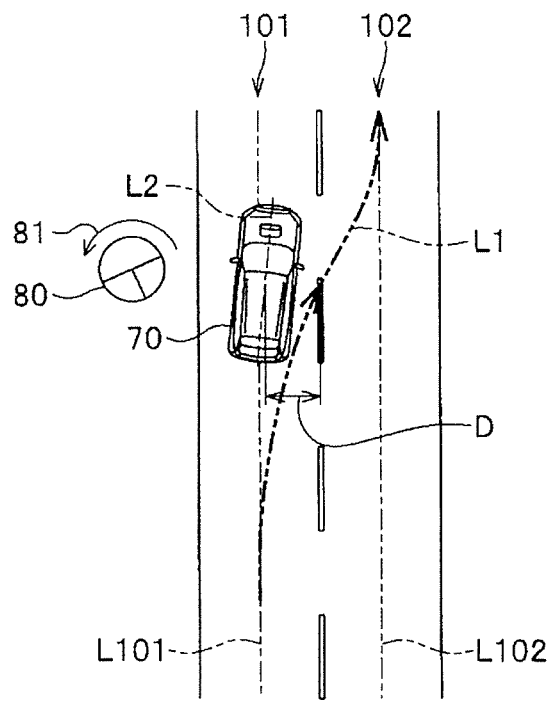
FIG. 8 illustrates an example of a state of a vehicle during execution of the lane change control according to one implementation of the technology.
Figure 9:
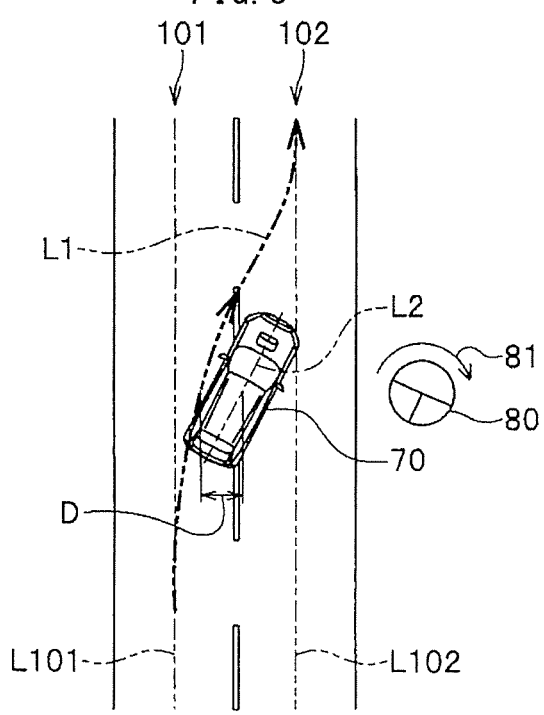
FIG. 9 illustrates another example of the state of the vehicle during the execution of the lane change control according to one implementation of the technology.

FIGS. 8 and 9 each illustrate a state of the vehicle during the execution of the lane change control. In FIGS. 8 and 9, the first direction D1 and the second direction D2 are expressed in a similar manner to those in FIGS. 4 and 5. Furthermore, in FIGS. 8 and 9, the vehicle, the steering wheel, the operational direction of the steering wheel, the first lane, the imaginary curve related to the target course, and the central line of the vehicle in its width direction are denoted by the same numerals as those in FIGS. 4 and 5. In FIGS. 8 and 9, the trajectory formed by the target points of the position of the vehicle 70 when the vehicle 70 changes lanes may be set to the imaginary curve L1. In FIGS. 8 and 9, the second lane is denoted by numeral 102, a central line of the first lane 101 is denoted by numeral L101, and a central line of the second lane 102 is denoted by numeral L102.

FIG. 8 illustrates a case where the vehicle 70 is shifted from the imaginary curve L1 in the second direction D2 when changing the lanes in the first direction D1. In this case, when the driver operates the steering wheel 80 in such a way that the vehicle 70 is oriented in the second direction D2, it is possible to reliably estimate that the driver attempts to perform the override and move the vehicle 70 in the second direction D2. In an example implementation, in any case where it is possible to reliably estimate a driver's intention to move the vehicle 70 in the second direction D2 as described above, the second threshold TH2 may be set to a higher value when the deviation D is equal to or less than the second reference value r21. Setting the second threshold TH2 in this manner makes it easier to stop the lane change control.

FIG. 9 illustrates a case where the vehicle 70 is shifted from the imaginary curve L1 in the first direction D1 when changing the lanes in the first direction D1. In this case, when the driver operates the steering wheel 80 in such a way that the vehicle 70 is oriented in the first direction D1, it is possible to reliably estimate that the driver attempts to perform the override and move the vehicle 70 in the first direction D1. In an example implementation, in any case where it is possible to reliably estimate a driver's intention to move the vehicle 70 in the first direction D1 as described above, the first threshold TH1 may be set to a lower value when the deviation D is equal to or greater than the first reference value r11. Setting the first threshold TH1 in this manner makes it easier to stop the lane change control.

FIG. 8 illustrates a situation in which the driver attempts to perform the override against the lane changing performed under the lane change control. FIG. 9 illustrates a situation in which the driver attempts to perform the override in accordance with the lane changing performed under the lane change control. As illustrated in FIG. 7, by differing absolute values of the first reference value r11 and the second reference value r21 from each other, it is possible to change ease of stopping the lane change control, in accordance with a situation in which the driver attempts to perform the override. In an example illustrated in FIG. 7, the absolute value of the second reference value r21 may be set to be less than the absolute value of the first reference value r11. This setting makes it easier to stop the lane change control in a situation where the driver attempts to perform the override against the lane changing performed under the lane change control.

In an unillustrated case where the vehicle 70 changes the lanes in the first direction D1, when the vehicle 70 is shifted from the imaginary curve L1 in the second direction D2 and the driver operates the steering wheel 80 in such a way that the vehicle 70 is oriented in the first direction D1 or when the vehicle 70 is shifted from the imaginary curve L1 in the first direction D1 and the driver operates the steering wheel 80 in such a way that the vehicle 70 is oriented in the second direction D2, it is unclear whether the driver attempts to override the lane change control or maintain the lane change control by correcting the position of the vehicle 70. In an example implementation, the suspension of the lane change control is made more difficult when it is difficult to reliably estimate a driver's intention as in the above cases than it is possible to reliably estimate the driver's intention.

The description that has been given with reference to FIGS. 8 and 9 may also be applied to a case where the vehicle changes the lanes in the second direction D2. In the case where the vehicle 70 is shifted from the imaginary curve L1 in the first direction D1, when the driver operates the steering wheel 80 in such a way that the vehicle 70 is oriented in the first direction D1, it is possible to reliably estimate that the driver attempts to perform the override and move the vehicle 70 in the first direction D1. In an example implementation, in any case where it is possible to reliably estimate a driver's intention to move the vehicle 70 in the first direction D1 as described above, the first threshold TH1 may be set to a lower value when the deviation D is equal to or greater than the first reference value r12. Setting the first threshold TH1 in this manner makes it easier to stop the lane change control.

Moreover, in the case where the vehicle 70 is shifted from the imaginary curve L1 in the second direction D2, when the driver operates the steering wheel 80 in such a way that the vehicle 70 is oriented in the second direction D2, it is possible to reliably estimate that the driver attempts to perform the override and move the vehicle 70 in the second direction D2. In an example implementation, when it is possible to reliably estimate a driver's intention to move the vehicle 70 in the second direction D2 as described above, the second threshold TH2 may be set to a higher value when the deviation D is equal to or less than the second reference value r22. Setting the second threshold TH2 in this manner makes it easier to stop the lane change control.

In an example illustrated in FIG. 7, the absolute value of the first reference value r12 may be set to be less than the absolute value of the second reference value r22. This setting makes it easier to stop the lane change control in a situation where the driver attempts to perform the override against the lane changing performed under the lane change control.

As in the case where the vehicle changes the lanes in the first direction D1, in the case where the vehicle 70 changes the lanes in the second direction D2, it is unclear whether the driver attempts to override the lane change control or maintain the lane change control by correcting the position of the vehicle 70, when the vehicle 70 is shifted from the imaginary curve L1 in the second direction D2 and the driver operates the steering wheel 80 in such a way that the vehicle 70 is oriented in the first direction D1 or when the vehicle 70 is shifted from the imaginary curve L1 in the first direction D1 and the driver operates the steering wheel 80 in such a way that the vehicle 70 is oriented in the second direction D2. In an example implementation, thus, the suspension of the lane change control is made more difficult when it is difficult to reliably estimate a driver's intention than when it is possible to reliably estimate a driver's intention.

In an example implementation, the values TH10, TH11, TH20, and TH21 and the reference values r11, r12, r21, r22, r51, r52, r61, and r62 may be a plurality of values related to the first threshold TH1 and the second threshold TH2. These values may be set by the threshold setting unit 15 or stored in the unillustrated storage.

According to the foregoing implementation, a driver's intention is estimated on the basis of the values of the steering torque and the deviation D. In addition, when it is possible to reliably estimate the driver's intention, the suspension of the lane change control is made easier. According to this implementation, it is possible to mitigate strangeness when the lane change control is to be stopped.

In an example implementation, the driver's intention may be estimated on the basis of a value of the steering torque, the operational state of the direction indicators, and a value of the deviation D. In addition, when it is possible to reliably estimate the driver's intention, the suspension of the lane keeping control is made easier. According to this implementation, thus, it is possible to mitigate strangeness when the lane keeping control is to be stopped.

In an example implementation, the deviation D may indicate an amount in which the vehicle 70 is shifted from the imaginary curve L1 related to the target course. When the lane keeping control is executed, the imaginary curve L1 may be set to the central line of the first lane. When the lane change control is executed, the imaginary curve L1 may be set to the trajectory formed by the target points of the position of the vehicle 70 when the vehicle 70 changes lanes. According to this implementation, it is possible to estimate a driver's intention in any of the lane keeping control and the lane change control.

The technology is not limited to the foregoing implementations, and thus may undergo various modifications and variations, for example, without departing from the inventive concept of the technology. For example, the numbers of thresholds used for the override determination, the number of reference values, and the magnitude relationship between the absolute values of the respective reference values are not limited to those in the examples given in the foregoing implementations. Therefore, any numbers of thresholds used for the override determination, and any numbers of reference values, and any magnitude relationship may be employed in so far as they fall within the scope of the appended claims or the equivalents thereof.

The traveling controller 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling controller 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling controller 10 illustrated in FIG. 1.

The invention claimed is:

1. A traveling control apparatus of vehicle, the traveling control apparatus comprising:
   a traveling controller configured to control a vehicle to automatically run along a target course;
   a position detector configured to detect a position of the vehicle; and
   a steering torque detector configured to detect a steering torque applied to a steering wheel by a driver,
   the traveling controller including
       a lane change controller configured to execute a lane change control under which the vehicle changes lanes from a first lane, along which the vehicle runs, to a second lane adjoining to the first lane, and
       a deviation calculator configured to calculate a deviation on a basis of the position of the vehicle, the deviation being an amount in which the vehicle is shifted from an imaginary curve that is related to the target course,
   wherein the steering torque, upon operation of the steering wheel to orient the vehicle in a first direction, is expressed as a positive value, the first direction being a direction parallel to a width direction of the first lane,
   wherein the steering torque, upon operation of the steering wheel to orient the vehicle in a second direction, is expressed as a negative value, the second direction being a direction opposite to the first direction,
   wherein the lane change controller stops the lane change control when the steering torque is equal to or greater than a first steering torque threshold having the positive value or when the steering torque is equal to or less than a second steering torque threshold having the negative value during execution the lane change control, and
   wherein the traveling controller is configured to vary, according to the deviation, the first steering torque threshold and the second steering torque threshold.

2. The traveling control apparatus of vehicle according to claim 1,
   wherein the deviation is represented by the amount in which the vehicle is shifted from the imaginary curve of the first lane in the width direction, and
   wherein, where the deviation, when the vehicle is shifted from the imaginary curve in the first direction, is expressed as a positive value, and where the deviation, when the vehicle is shifted from the imaginary curve in the second direction, is expressed as a negative value:
       the first steering torque threshold, where the deviation is equal to or greater than a first reference value, is less than the first steering torque threshold where the deviation is less than the first reference value, the first reference value being the positive value; and
       the second steering torque threshold, where the deviation is equal to or less than a second reference value, is greater than the second steering torque threshold where the deviation is greater than the second reference value, the second reference value being the negative value.

3. The traveling control apparatus of vehicle according to claim 2, wherein
   the first reference value where the second lane is present in the first direction with respect to the first lane is greater than the first reference value where the second lane is present in the second direction with respect to the first lane, and
   the second reference value where the second lane is present in the first direction with respect to the first lane is greater than the second reference value where the second lane is present in the second direction with respect to the first lane.

4. The traveling control apparatus of vehicle according to claim 1, wherein, during execution of the lane change control, the imaginary curve is set to a trajectory and intersects a border between the first lane and the second lane, the trajectory including a target point of the position of the vehicle when the vehicle changes the lanes.

5. The traveling control apparatus of vehicle according to claim 2, wherein, during execution of the lane change control, the imaginary curve is set to a trajectory and intersects a border between the first lane and the second lane, the trajectory including a target point of the position of the vehicle when the vehicle changes the lanes.

6. The traveling control apparatus of vehicle according to claim 3, wherein, during execution of the lane change control, the imaginary curve is set to a trajectory and intersects a border between the first lane and the second lane, the trajectory including a target point of the position of the vehicle when the vehicle changes the lanes.

7. The traveling control apparatus of vehicle according to claim 1, wherein
   the traveling controller further includes:
       a lane keeping controller configured to execute a lane keeping control under which the vehicle is kept in the first lane; and
       a direction indication detector configured to detect an operational state of a direction indicator of the vehicle,
   the lane keeping controller stops the lane keeping control, when the steering torque is equal to or greater than a third steering torque threshold having a positive value or when the steering torque is equal to or less than a fourth steering torque threshold having a negative value while the lane keeping controller executes the lane keeping control, and
   the traveling controller varies the third steering torque threshold and the fourth steering torque threshold in accordance with the deviation and the operational state of the direction indicator.

8. The traveling control apparatus of vehicle according to claim 7,
   wherein the deviation is represented by the amount in which the vehicle is shifted from the imaginary curve of the first lane in the width direction, and
   wherein, where the deviation, when the vehicle is shifted from the imaginary curve in the first direction, is expressed as a positive value, and where the deviation, when the vehicle is shifted from the imaginary curve in the second direction, is expressed as a negative value:
       the third steering torque threshold, where the deviation is equal to or greater than a third reference value and the direction indicator indicates the first direction, is less than the third steering torque threshold where the direction indicator does not indicate the first direction, or is less than the third steering torque threshold where the deviation is less than the third reference value and the direction indicator indicates the first direction, the third reference value being the positive value; and
       the fourth steering torque threshold, where the deviation is equal to or less than a fourth reference value and the direction indicator indicates the second direction, is greater than the fourth steering torque threshold where the direction indicator does not indicate the second direction, or is greater than the fourth steering torque threshold where the deviation is greater than the fourth reference value and the direction indicator indicates the second direction, the fourth reference value being the negative value.

9. The traveling control apparatus of vehicle according to claim 7, wherein the imaginary curve is set to a central line of the first lane during execution of the lane keeping control.

10. The traveling control apparatus of vehicle according to claim 8, wherein the imaginary curve is set to a central line of the first lane during execution of the lane keeping control.

11. The traveling control apparatus of vehicle according to claim 1, wherein the position detector comprises an external environment recognizer that recognizes geometries of the first lane and the second lane on a basis of an image captured by a camera device.

12. The traveling control apparatus of vehicle according to claim 2, wherein the position detector comprises an external environment recognizer that recognizes geometries of the first lane and the second lane on a basis of an image captured by a camera device.

13. The traveling control apparatus of vehicle according to claim 1, wherein the position detector comprises a navigation device that acquires information regarding the position of the vehicle and information regarding geometries of the first lane and the second lane, on a basis of position information from a positioning satellite.

14. The traveling control apparatus of vehicle according to claim 2, wherein the position detector comprises a navigation device that acquires information regarding the position of the vehicle and information regarding geometries of the first lane and the second lane, on a basis of position information from a positioning satellite.

15. A traveling control apparatus of vehicle, the traveling control apparatus comprising:
   a position detector configured to detect a position of a vehicle;
   a steering torque detector configured to detect a steering torque applied to a steering wheel by a driver; and
   circuitry configured to
      control the vehicle to automatically run along a target course,
      execute a lane change control under which the vehicle changes lanes from a first lane, along which the vehicle runs, to a second lane adjoining to the first lane,
      calculate a deviation on a basis of the position of the vehicle, the deviation being an amount in which the vehicle is shifted from an imaginary curve that is related to the target course,
      stop, where the steering torque, upon operation of the steering wheel to orient the vehicle in a first direction, is expressed as a positive value, and where the steering torque, upon operation of the steering wheel to orient the vehicle in a second direction, is expressed as a negative value, the lane change control when the steering torque is equal to or greater than a first steering torque threshold having the positive value or when the steering torque is equal to or less than a second steering torque threshold having the negative value during execution of the lane change control, the first direction being a direction parallel to a width direction of the first lane, the second direction being a direction opposite to the first direction, and
      vary the first steering torque threshold and the second steering torque threshold in accordance with the deviation.

\* \* \* \* \*